(12) United States Patent
Chapman

(10) Patent No.: US 6,390,535 B1
(45) Date of Patent: May 21, 2002

(54) SLIDING DOOR CLOSURE APPARATUS

(75) Inventor: David Joseph Chapman, Sterling Heights, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/658,783

(22) Filed: Sep. 11, 2000

(51) Int. Cl.⁷ .................................................. B60J 5/06
(52) U.S. Cl. ............................ 296/155; 49/360; 49/138
(58) Field of Search ............................ 296/155, 146.1; 49/216, 360, 138

(56) References Cited

U.S. PATENT DOCUMENTS

| | | | | |
|---|---|---|---|---|
| 5,018,303 A | * | 5/1991 | Koura et al. ............... | 49/360 X |
| 5,062,241 A | * | 11/1991 | Deland ......................... | 49/360 |
| 5,069,000 A | * | 12/1991 | Zuckerman ............... | 49/360 X |
| 5,189,839 A | * | 3/1993 | Deland et al. ................. | 49/360 |
| 5,316,365 A | * | 5/1994 | Kuhlman et al. ............ | 296/155 |
| 5,319,880 A | * | 6/1994 | Kuhlman ...................... | 46/360 |
| 5,319,881 A | * | 6/1994 | Kuhlman ...................... | 49/360 |
| 5,396,158 A | * | 3/1995 | Long et al. .................. | 318/282 |
| 5,867,940 A | * | 2/1999 | Watanabe et al. ............. | 49/360 |

* cited by examiner

Primary Examiner—Joseph D. Pape
Assistant Examiner—Lori L. Coletta
(74) Attorney, Agent, or Firm—Kathryn A. Marra

(57) ABSTRACT

A cable drive assembly in a closed-loop cable closure system for opening and closing a sliding door on a vehicle includes helical front and rear cable grooves supported on the vehicle frame for rotation about a helix axis. A front cable extends from the front cable groove to the sliding door in a position to be wound into and unwound from the front cable groove in response to front cable groove rotation about the helix axis. A rear cable extends from the rear cable groove to the sliding door in a position to be wound into and unwound from the rear cable groove in response to rear cable groove rotation about the helix axis. A single cable drive spool is supported on the vehicle frame for rotation about the helix axis and includes both the front and the rear cable grooves. A motor rotates the spool in one direction about the helix axis to open the sliding door and in an opposite direction about the helix axis to close the sliding door.

11 Claims, 5 Drawing Sheets

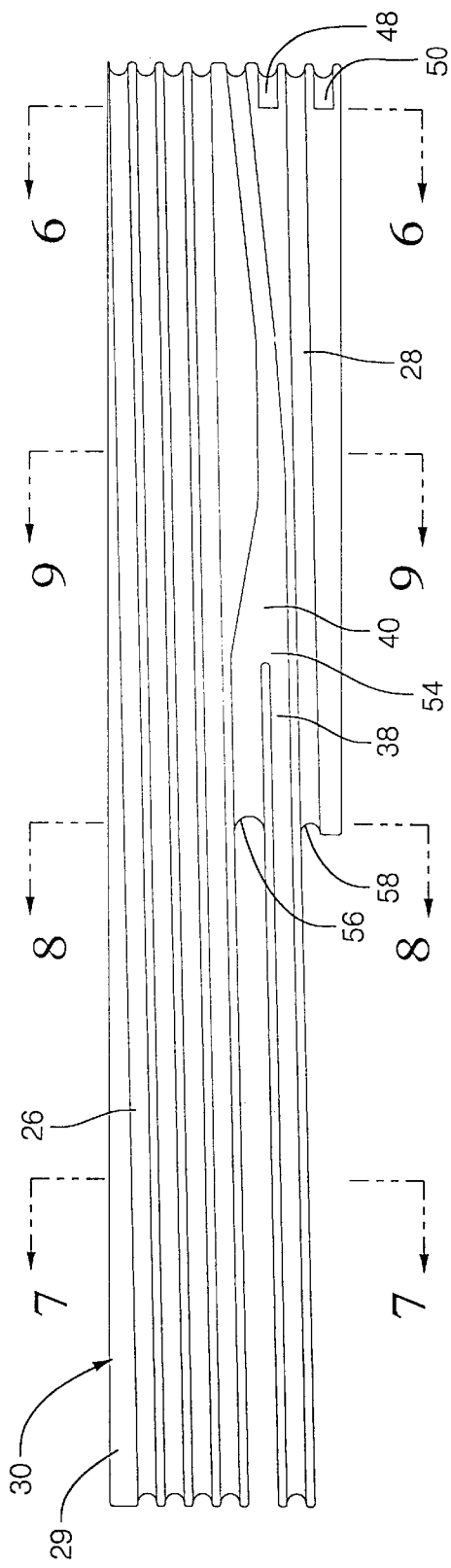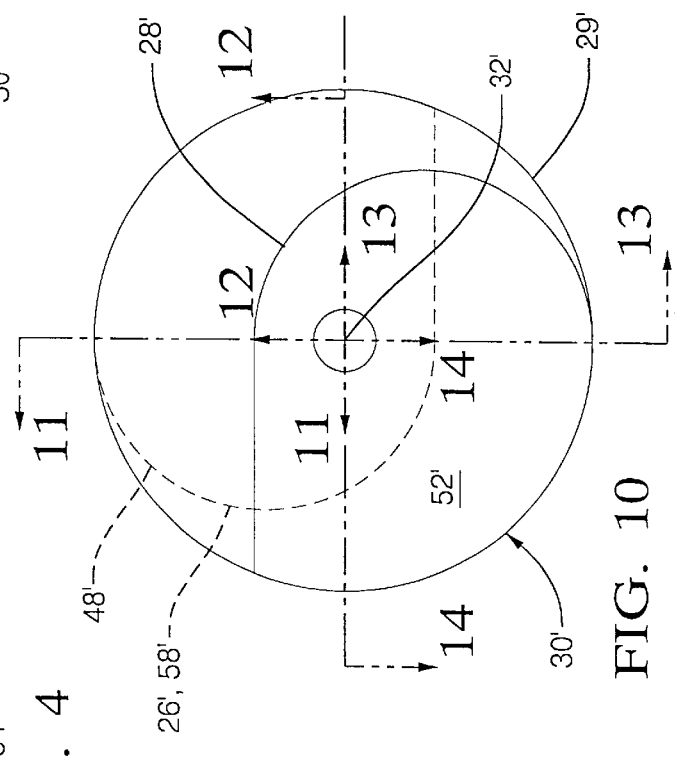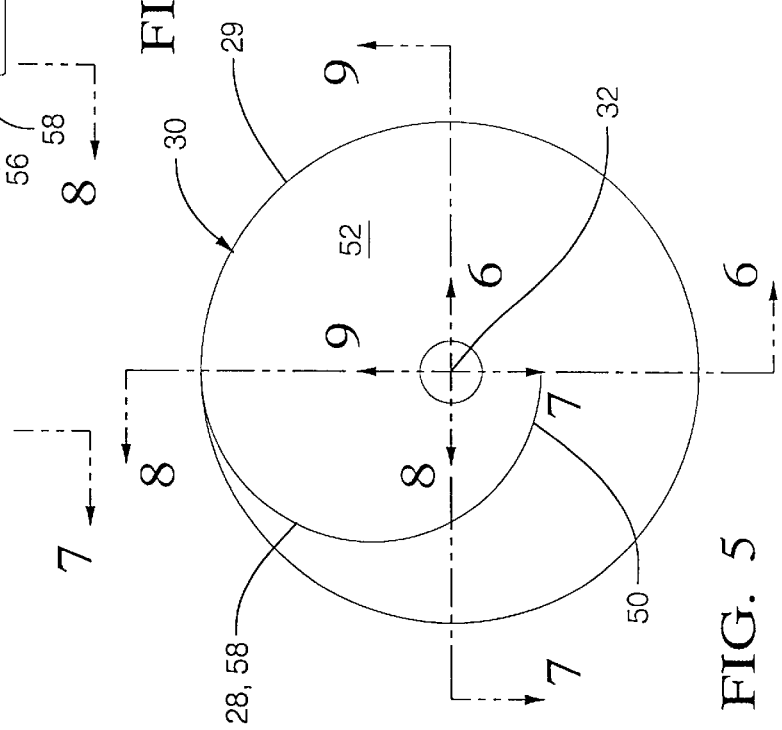
FIG. 4
FIG. 10
FIG. 5

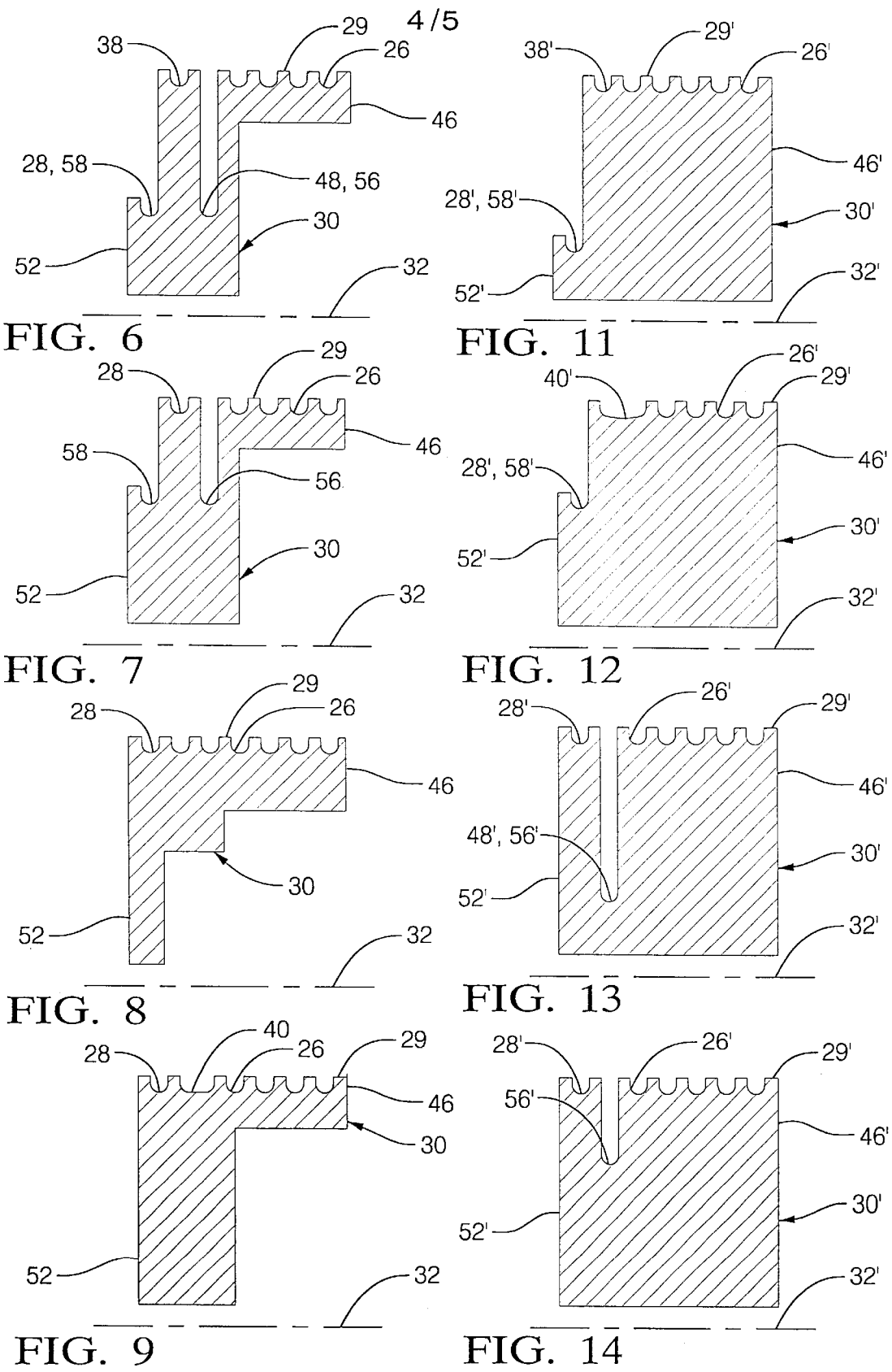

SLIDING DOOR CLOSURE APPARATUS

TECHNICAL FIELD

This invention relates generally to a sliding door closure apparatus for opening and closing a sliding door on a vehicle.

BACKGROUND OF THE INVENTION

Van type vehicles for passengers and for cargo are frequently equipped with sliding side doors. Rollers support and guide such sliding doors by running in fixed tracks. Sliding doors may be positioned on both sides of a vehicle or a single sliding door may be positioned on one side of a vehicle. However, most vans include a single sliding door positioned on a side of the van opposite the vehicle operator's station. When seated at the vehicle operator's station, a vehicle operator can open or close sliding doors of this type only by leaving the operator's station and either walking around the outside of the vehicle to the sliding door or crossing inside the vehicle to the sliding door. Crossing inside the vehicle is often difficult or impossible due to the presence of cargo and/or passengers positioned inside the van between the operator's station and the door. If a sliding door is positioned on the same side of the van as the operator's station, the operator still must leave the operator's station to open and shut the sliding door from either the inside or outside of the vehicle.

To allow an operator to open and close a sliding door from the operator's station and/or another location remote from the sliding door, powered sliding door closure systems have been developed. An example of such a system is disclosed in U.S. Pat. No. 5,316,365 which issued May 31, 1994 to Kuhlman et al., is assigned to the assignee of the present invention and is incorporated herein by reference. The Kuhlman et al. patent discloses a sliding door closure apparatus that includes a sliding door mounted in a van on rollers and slidably supported in upper, center and lower tracks. An opening and closing module is mounted inside the van adjacent the center track. A front cable is attached to a front cable drive pulley or spool and extends from the front spool to the sliding door through a front cable roller guide assembly. A rear cable is attached to a rear cable drive pulley or spool and extends from the rear spool to the sliding door through a rear cable roller guide assembly. The front and rear cable drive spools each have a large diameter helical cable groove, a small diameter helical cable groove and a transition cable groove that connects and provides a cable path between the large and small diameter grooves. A motor rotates the front and rear cable drive spools to move the sliding door. The small diameter cable grooves of the cable drive spools are configured to drive the sliding door slowly when the door is in the forward portion of the tracks, i.e., when the door is moving into and out of a closed position. The large diameter cable grooves of the spools are configured to drive the sliding door more quickly when the door is in center and rear portions of the tracks away from the closed position. The sliding door closure apparatus disclosed in the Kuhlman et al. patent also includes fixed idler rollers that guide the front and rear cables to and from the cable drive spools.

SUMMARY OF THE INVENTION

According to the invention, a sliding door closure apparatus for opening and closing a sliding door on a vehicle is provided. The apparatus includes helical front and rear cable grooves supportable on the vehicle for rotation about a helix axis. A front cable receptacle is disposed in the front cable groove and is configured to receive one end of a front cable that extends from the front cable groove to a vehicle sliding door in a position to be wound into and unwound from the front cable groove in response to front cable groove rotation in respective opposing directions about the helix axis. A rear cable receptacle is disposed in the rear cable groove and is configured to receive one end of a rear cable that extends from the rear cable groove to the sliding door in a position to be unwound from and wound onto the rear cable groove in response to rear cable groove rotation in respective opposing directions about the helix axis.

The sliding door closure apparatus also includes a single cable drive spool supported on the vehicle for rotation about the helix axis and including both the front and the rear cable grooves. Therefore, a sliding door closure apparatus constructed according to the invention requires less packing space and fewer parts to operate than prior art door closure systems.

BRIEF DESCRIPTION OF THE DRAWINGS

These and other features and advantages of the invention will become apparent to those skilled in the art in connection with the following detailed description and drawings, in which:

FIG. 4 is a schematic unrolled circumference view of the spool of FIG. 2;

FIG. 5 is a schematic side view of the spool of FIG. 2;

FIG. 6 is a schematic partial cross-sectional view of the spool of FIG. 2 taken along line 6—6 of FIG. 5;

FIG. 7 is a schematic partial cross-sectional view of the spool of FIG. 2 taken along line 7—7 of FIG. 5;

FIG. 8 is a schematic partial cross-sectional view of the spool of FIG. 2 taken along line 8—8 of FIG. 5;

FIG. 9 is a schematic partial cross-sectional view of the spool of FIG. 2 taken along line 9—9 of FIG. 5;

FIG. 10 is a schematic side view of a spool constructed according to an alternative embodiment of the invention;

FIG. 11 is a schematic partial cross-sectional view of the spool of FIG. 10 taken along line 11—11 of FIG. 10;

FIG. 12 is a schematic partial cross-sectional view of the spool of FIG. 10 taken along line 12—12 of FIG. 10;

FIG. 13 is a schematic partial cross sectional view of the spool of FIG. 10 taken along the line 13—13 of FIG. 10;

FIG. 14 is a schematic partial cross sectional view of the spool of FIG. 10 taken along the line 14—14 of FIG. 10.

DETAILED DESCRIPTION

Figure 1:
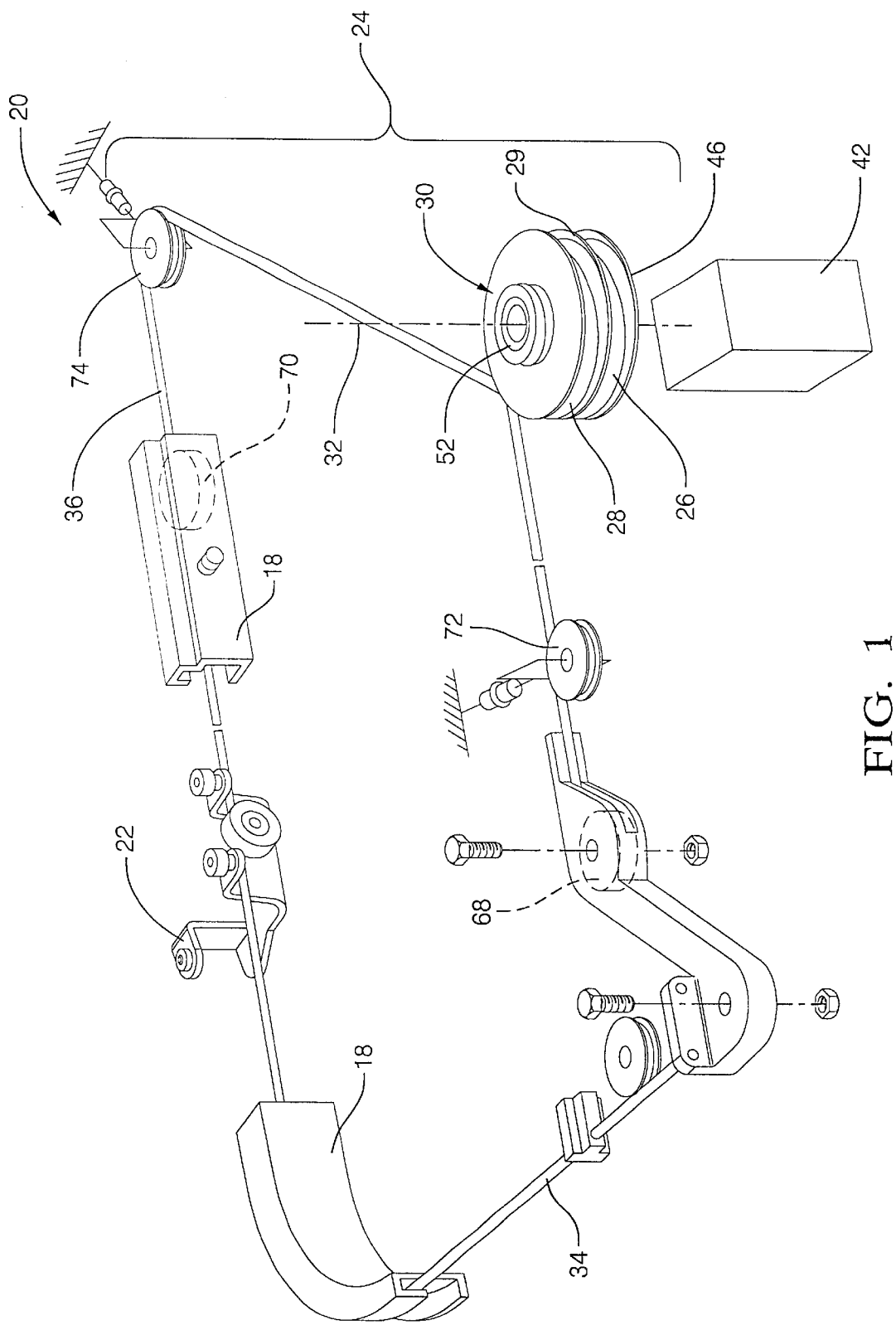
FIG. 1 is a schematic perspective view of a sliding door closure apparatus constructed according to the invention as well as a track and roller system that supports and guides a sliding door that the apparatus powers.

A closed loop cable closure system of a door closure apparatus for opening and closing a sliding door on a vehicle is generally shown at 20 in FIG. 1. In FIG. 1 the system 20 is shown configured to be installed with a door closure apparatus in a van that includes a sliding door supported on a sliding door track mounted on a vehicle frame. The system 20 includes a sliding door bracket, shown at 22 in FIG. 1, that connects the closure system 20 to the sliding door. The door closure apparatus moves the sliding door and sliding door bracket 22 along the sliding door track between a closed position and an open position. The closed loop cable closure system 20 is mounted on the vehicle frame and includes a cable drive assembly 24.

The following is a description of a cable drive assembly 24 constructed according to the invention and configured for use in a closed loop cable closure system 20 such as that described in U.S. Pat. No. 5,316,365 which is incorporated herein by reference.

Figure 15:
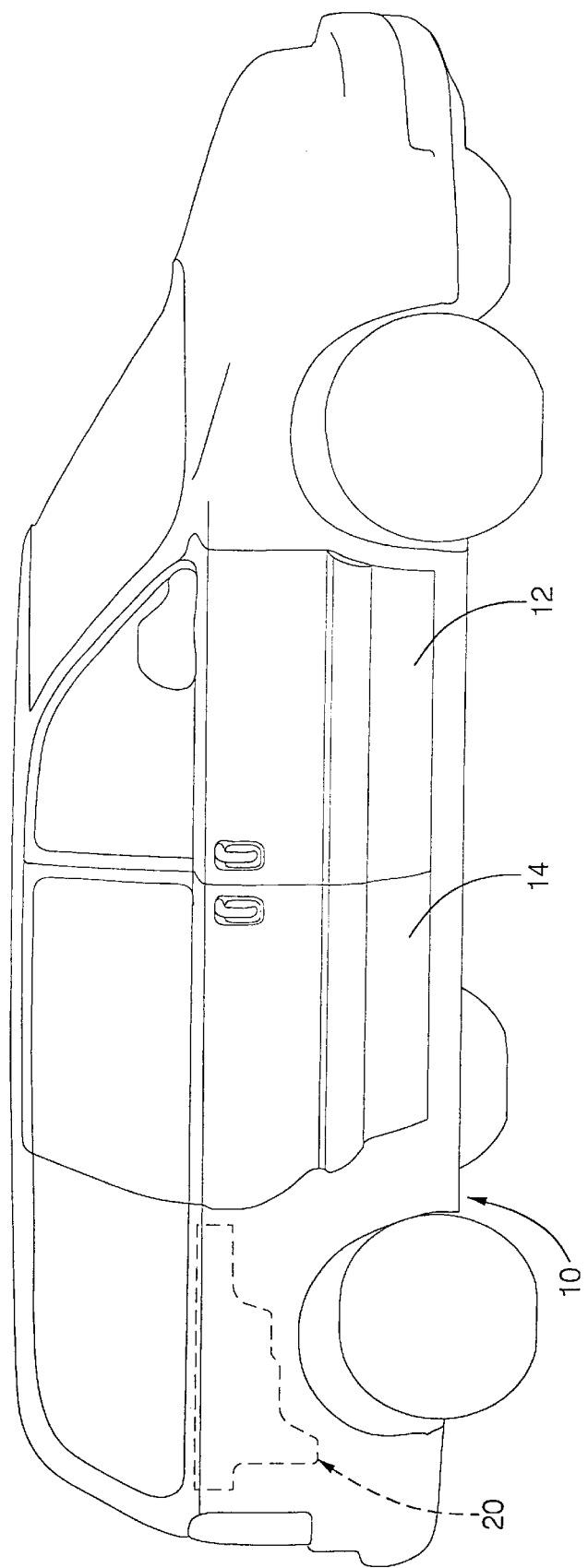
FIG. 15 is a view of a left side of a passenger van with a power sliding door.

As indicated in the patent, vehicles, such as the passenger van 10 shown in FIG. 15 have a hinged front door 12 and a rear side door that is commonly a sliding door 14. Sliding door 14 is supported and guided by an upper track, a center track and a lower track. The closed loop cable system 20 operates in conjunction with the center track 18 shown in FIG. 1.

The cable drive assembly 24 includes a helical front cable groove 26 and a helical rear cable groove 28 formed into an outer circumferential surface 29 of a single spool 30. A first embodiment of the spool 30 is generally indicated at 30 in FIGS. 1–9. A second embodiment of the spool 30 is generally indicated at 30' in FIGS. 10–14. Reference numerals with the designation prime' in FIGS. 10–14 indicate alternative configurations of elements that also appear in the first embodiment. Unless indicated otherwise, where a portion of the following description uses a reference numeral to refer to the figures, we intend that portion of the description to apply equally to elements designated by primed numerals in FIGS. 10–14.

The spool 30 is supported on the vehicle frame for rotation about a helix axis 32. Front and rear cables 34, 36 are wound on the spool 30 such that the front and rear cables 34, 36 extend from helical cable groove portions of generally equal helical diameter throughout the travel of the door between the open and closed positions.

Figure 2:
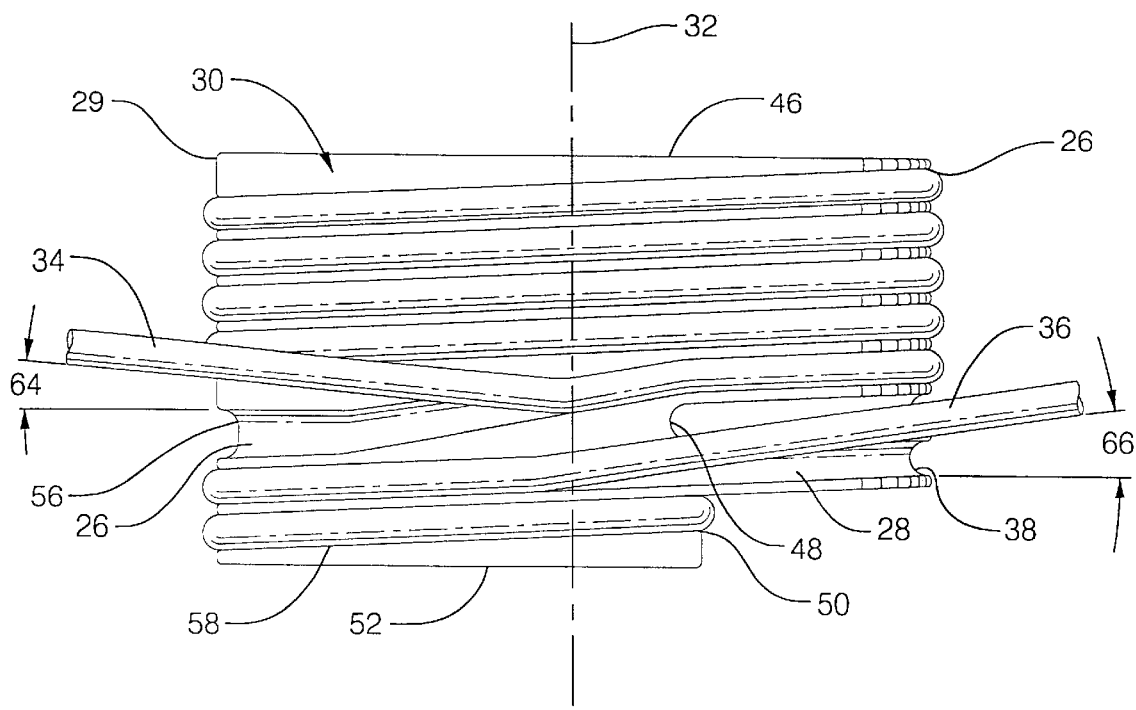
FIG. 2 is a partial schematic top view of a spool and front and rear cables of the sliding door closure apparatus of FIG. 1.
Figure 3:
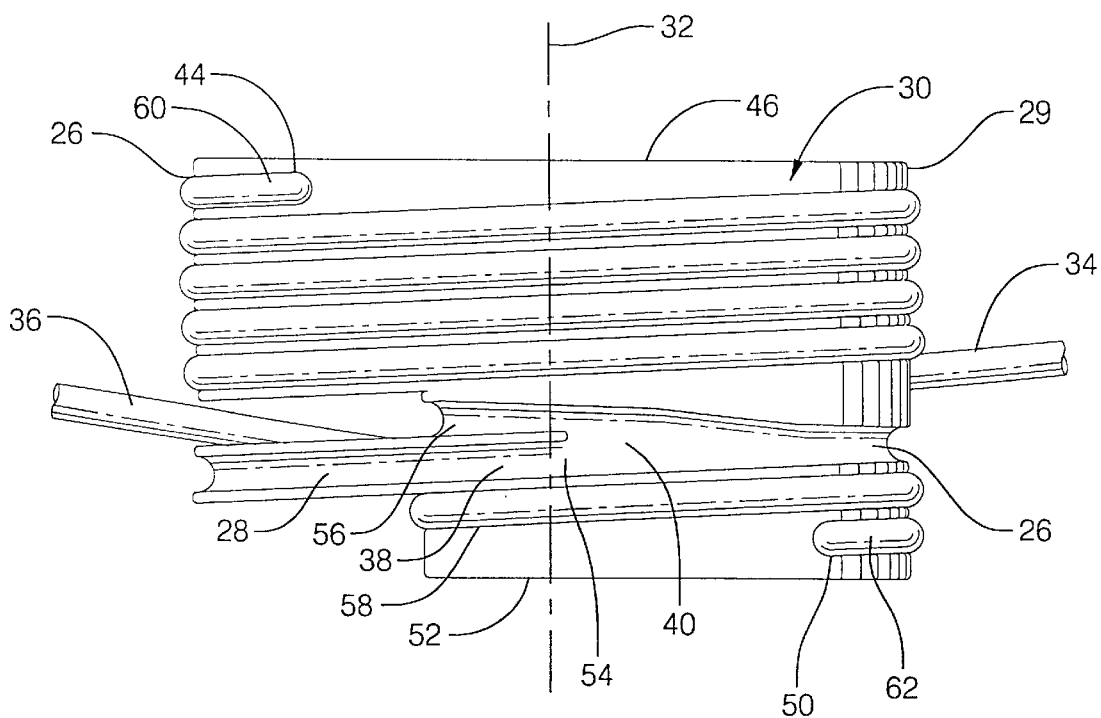
FIG. 3 is a partial schematic bottom view of the spool and cables of FIG. 2.

As is best shown in FIGS. 1–3, the front and rear cables 34, 36 are wound in opposite circumferential directions around the spool 30 and extend from the spool 30 in generally opposite directions from the same general location on the outer circumferential surface 29 of the spool 30. In other words, the front and rear cables 34, 36 wrap onto and unwrap from the spool 30 at the same general location on the outer circumferential surface 29 of the spool 30.

As best shown in FIGS. 6–9, both the front and rear cable grooves 26, 28 have generally semi-circular concave cross-sections and are disposed around the spool 30 as right-handed helices with their common helix axis 32 being coaxially disposed along a central rotational spool axis. As shown in FIGS. 3 and 4, one branch 38 of a groove fork 40 formed in the outer circumferential surface 29 of the spool 30 merges the front cable groove 26 into the rear cable groove 28. The groove fork 40 guides the rear cable 36 smoothly from the rear cable groove 28 to the front cable groove 26 as the door opens. The groove fork 40 also serves to guide the front cable 34 as is explained further below. The single cable drive spool 30 includes both the front and the rear cable grooves 26, 28 to reduce the amount of space and the number of parts required to support winding and unwinding of the front and rear cables 34, 36.

The front cable 34 extends from the front cable groove 26 to the sliding door bracket 22 in a position to be wound onto the spool 30 and into the front cable groove 26 in response to spool 30 and front cable groove 26 rotation about the helix/spool axis 32 in a forward direction which closes the sliding door. When the spool 30 and front cable groove 26 rotate in a reverse direction, opposite the forward direction, to open the sliding door, the front cable 34 winds off of the spool 30 and out of the front cable groove 26.

Similarly, the rear cable 36 extends from the rear cable groove 28 to the sliding door bracket 22 in a position to be wound off of the spool 30, first from the forward cable groove 26, then from the rear cable groove 28 in response to spool 30 and rear cable groove 28 rotation about the helix/spool axis 32 in the forward direction which closes the sliding door. When the spool 30 and rear cable groove 28 rotate in the reverse direction to open the sliding door, the rear cable 36 winds onto the spool 30, first into the rear cable groove 28 and then into the front cable groove 26.

As shown in FIG. 1, a motor 42 is drivingly connected to the spool 30 and is configured to rotate the spool 30 and grooves 26, 28 in the forward direction about the spool/helix axis 32 to close the sliding door and in the reverse direction about the spool/helix axis 32 to open the sliding door.

An outer end 44 of the front cable groove 26 is disposed at a first axial end 46 of the spool 30 as shown in FIG. 3 and an inner end 48 disposed at a point along the outer circumferential surface 29 of the spool 30 approximately two-thirds the axial length of the spool 30 as measured from the first axial end 46 of the spool 30. The helical diameter of the front cable groove 26 is greater at the outer end 44 of the groove 26 than it is at the inner end 48 of the front cable groove 26.

An outer end 50 of the rear cable groove 28 is disposed at a second axial end 52 of the spool 30 opposite the first axial end 46 as shown in FIGS. 3 and 5. As is also shown in FIGS. 3 and 5, the rear cable groove 28 also has an inner end 54 disposed at a point along the outer circumferential surface 29 of the spool 30 approximately one-third the axial length of the spool 30 as measured from the second axial end 52. The helical diameter of the outer end 50 of the rear cable groove 28 is less than the helical diameter of the inner end 54 of the rear cable groove 28.

The front cable groove 26 includes a front diametrical transition or cam portion 56 extending between and connecting large and small diameter portions of the front cable groove 26. The rear cable groove 28 includes a rear diametrical transition or cam portion 58 extending between and connecting large and small diameter portions of the rear cable groove 28. The cam portions 56, 58 of the front and rear cable grooves 26, 28 are disposed axially adjacent one another on the spool 30 and adjacent the axial rear end of the spool 30.

As shown in FIG. 3, an outer end 60 of the front cable 34 is fixed to the axial front end 46 of the spool 30 adjacent the outer end 44 of the front cable groove 26. From its attachment point the front cable 34 winds into the large-diameter portion of the front cable groove 26 for approximately two-thirds of the travel of the sliding door starting from the open position. The front cable 34 winds into the decreasing-diameter cam portion 56 of the front cable groove 26 as the door is approaching its closed position and reaches the small-diameter inner end 48 of the front cable groove 26 when the door is in its closed position. The decreasing diameter of the cam portion 56 of the front cable groove 26 causes the door to slow as it approaches the closed position.

As is also shown in FIG. 3, an outer end 62 of the rear cable 36 is fixed to the axial rear end 52 of the spool 30 adjacent the outer end 50 of the rear cable groove 28. From its attachment point the rear cable 36 winds into the cam portion 58 of the rear cable groove 28, then into the large-diameter portion of the rear cable groove 28, then through the fork 40 to the large-diameter portion of the front cable groove 26 as the sliding door is opened. When the sliding door is closed, the rear cable 36 winds out of the front cable groove 26 before winding out of the large diameter portion of the rear cable groove 28. The rear cable 36 then winds out of the decreasing-diameter cam portion 58 of the rear cable groove 28 as the sliding door is approaching its closed position and the front cable 34 is winding into the decreasing-diameter cam portion 56 of the front cable groove 26. The rear cable 36 finishes unwinding at the small-diameter inner end 54 of the rear cable groove 28 when the door is in its closed position and the front cable 34 reaches the small-diameter inner end 48 of the front cable groove 26. This insures that the rear cable 36 pays out from the spool 30 at the same rate that the front cable 34 winds onto the spool 30 as the sliding door is closing.

In the embodiment of FIGS. 1–9 the front and rear cam portions 56, 58 of the front and rear cable grooves 26, 28 are disposed in a parallel manner on the spool 30. However, in other embodiments, such as the embodiment of FIGS. 10–14, the front and rear cam portions 56', 58' may be radially offset from one another.

As best shown in FIG. 3, the groove fork 40 splits the front cable groove 26 into the branch 38 that merges into the large diameter portion of the rear cable groove 28 as described above and another branch that merges into the cam portion 56 of the front cable groove 26 and dead-ends at the small diameter portion of the front cable groove 26. As can best be understood by referring to FIGS. 2 and 3, the groove fork 40 allows the rear cable 36 to wind from the rear cable groove 28 to the front cable groove 26 without falling into the cam portion 56 of the front cable groove 26 as the door moves toward the open position. Instead, after emerging from the rear cable groove 28 cam portion 58 onto the large diameter portion of the rear cable groove 28 the rear cable 36 skips over the cam portion 56 of the front cable groove 26 and winds into the large diameter portion of the front cable groove 26 as the front cable 34 is unwinding from the large diameter portion of the front cable groove 26.

As shown in FIG. 2, the front and rear cables 34, 36 exit the spool 30 at respective opposing front and rear cable fleet angles 64, 66. The rear cable fleet angle 66 insures that the rear cable 36 will "take the higher path", wrapping into the large diameter portion of the front cable groove 26 while avoiding the cam portion 56 of the front cable groove 26 as the door moves toward the open position. The front cable 34 fleet angle 64 insures that the front cable 34 will "take the lower path" wrapping into the cam portion 56 of the front cable groove 26 rather than wrapping into the large diameter portion of the rear cable groove 28 as the door moves toward the closed position.

As shown in FIG. 1, the closed loop cable closure system 20 shown in the drawings also includes fixed idler rollers 68, 70 that are mounted on the vehicle frame and are spaced from the spool 30. Two spring biased rollers 72, 74 are mounted on the frame between the cable drive spool 30 and the respective fixed idler rollers 68, 70 and are spring biased into contact with the respective front and rear cables 34, 36. The fixed idler rollers 68, 70 and the spring biased rollers 72, 74 are mounted in positions that provide a generally constant amount of tension on the front and rear cables 34, 36 regardless of whether the cables 34, 36 are being driven by the large diameter portions of the cable grooves 26, 28 or the cam 56, 58 or small diameter portions of the cable grooves 26, 28.

This description is intended to illustrate certain embodiments of the invention rather than to limit the invention. Therefore, it uses descriptive rather than limiting words. Obviously, it's possible to modify this invention from what the description teaches. Within the scope of the claims, one may practice the invention other than as described.

What is claimed is:

1. A sliding door closure apparatus for opening and closing a sliding door on a vehicle, the apparatus comprising:

a helical front cable groove supportable on the vehicle for rotation about a helix axis;

a helical rear cable groove supportable on the vehicle for rotation about the helix axis;

a front cable receptacle disposed in the front cable groove and configured to receive one end of a front cable that extends from the front cable groove to a vehicle sliding door in a position to be wound into and unwound from the front cable groove in response to front cable groove rotation in respective opposing first and second directions about the helix axis;

a rear cable receptacle disposed in the rear cable groove and configured to receive one end of a rear cable that extends from the rear cable groove to the sliding door in a position to be unwound from and wound onto the rear cable groove in response to rear cable groove rotation in respective opposing first and second directions about the helix axis;

an outer end of the front cable groove having a helical diameter larger than that of an inner end of the front cable groove;

an outer end of the rear cable groove having a helical diameter larger than that of an inner end of the rear cable groove;

the front cable groove including a front diametrical transition portion extending between and connecting large and small diameter portions of the front cable groove;

the rear cable groove including a rear diametrical transition portion extending between and connecting large and small diameter portions of the rear cable groove;

a groove fork that splits the front cable groove into one branch that merges into the large diameter portion of the rear cable groove and another branch that merges into the diametrical transition portion of the front cable groove and dead-ends at the small diameter portion of the front cable groove, and a cable drive spool supported on the vehicle for rotation about the helix axis and including both the front cable groove, the rear cable groove and the groove fork to reduce the amount of space and the number of parts required to support winding and unwinding of the front and rear cables.

2. A sliding door closure apparatus for moving a vehicle sliding door between an open and a closed position, the apparatus comprising:

a closed loop cable closure system mounted on the vehicle and comprising a cable drive assembly that includes:

a helical front cable groove supported on the vehicle for rotation about a helix axis;

a helical rear cable groove supported on the vehicle for rotation about the helix axis;

an outer end of the front cable groove having a helical diameter larger than that of an inner end of the front cable groove;

an outer end of the rear cable groove having a helical diameter larger than that of an inner end of the rear cable groove;

the front cable groove including a front diametrical transition portion extending between and connecting large and small diameter portions of the front cable groove;

the rear cable groove including a rear diametrical transition portion extending between and connecting large and small diameter portions of the rear cable groove;

a groove fork that splits the front cable groove into one branch that merges into the large diameter portion of the rear cable groove and another branch that merges into the diametrical transition portion of the front cable groove and dead-ends at the small diameter portion of the front cable groove, a front cable that extends from the front cable groove to the sliding door in a position to be wound into and unwound from the front cable groove in response to front cable groove rotation about the helix axis;

a rear cable that extends from the rear cable groove to the sliding door in a position to be wound into and unwound from the rear cable groove in response to rear cable groove rotation about the helix axis;

a motor drivingly connected to the cable grooves and configured to rotate the grooves in one direction about the helix axis to open the sliding door and in an opposite direction about the helix axis to close the sliding door; and a cable drive spool supported on the vehicle for rotation about the helix axis and including the front cable groove, the rear cable groove and the groove fork.

3. A sliding door closure apparatus as defined in claim 2 in which:

the door travels between the open and closed positions, and the front and rear cables are wound on the spool such that the front and rear cables extend from helical cable groove portions of generally equal helical diameter throughout the travel of the door between the open and closed positions.

4. A sliding door closure apparatus as defined in claim 3 in which:

one end of the front cable is fixed to an axial front end of the spool;

one end of the rear cable is fixed to an axial rear end of the spool; and the diametrical transition portions of the front and rear cable grooves are disposed axially adjacent one another on the spool and adjacent the axial rear end of the spool.

5. A sliding door closure apparatus as defined in claim 4 in which:

the front and rear cable grooves are disposed in an outer circumferential surface of the spool;

the front and rear cables are wound in opposite circumferential directions around the spool; and the front and rear cables extend from the spool in generally opposite directions from a substantially common generally radial plane at the outer circumferential surface of the spool.

6. A sliding door closure apparatus for moving a vehicle sliding door that travels between open and closed positions, the apparatus comprising:

a closed loop cable closure system mounted on the vehicle and comprising a cable drive assembly that includes:

a helical front cable groove supported on the vehicle for rotation about a helix axis;

a helical rear cable groove supported on the vehicle for rotation about the helix axis;

a front cable that extends from the front cable groove to the sliding door in a position to be wound into and unwound from the front cable groove in response to front cable groove rotation about the helix axis;

a rear cable that extends from the rear cable groove to the sliding door in a position to be wound into and unwound from the rear cable groove in response to rear cable groove rotation about the helix axis;

a motor drivingly connected to the cable grooves and configured to rotate the grooves in one direction about the helix axis to open the sliding door and in an opposite direction about the helix axis to close the sliding door;

a single cable drive spool supported on the vehicle for rotation about the helix axis and including both the front and the rear cable grooves.

an outer end of the front cable groove having a helical diameter larger than that of an inner end of the front cable groove;

an outer end of the rear cable groove having a helical diameter larger than that of an inner end of the rear cable groove;

the front and rear cables being wound on the spool such that the front and rear cables extend from helical cable groove portions of generally equal helical diameter throughout the travel of the door between the open and closed positions.

one end of the front cable being fixed to an axial front end of the spool;

one end of the rear cable being fixed to an axial rear end of the spool;

the front cable groove including a front diametrical transition portion extending between and connecting large and small diameter portions of the front cable groove;

the rear cable groove including a rear diametrical transition portion extending between and connecting large and small diameter portions of the rear cable groove;

the diametrical transition portions of the front and rear cable grooves being disposed axially adjacent one another on the spool and adjacent the axial rear end of the spool;

the front and rear cable grooves being disposed in an outer circumferential surface of the spool;

the front and rear cables being wound in opposite circumferential directions around the spool; and the front and rear cables extending from the spool in generally opposite directions from the outer circumferential surface of the spool, and a groove fork that splits the front cable groove into one branch that merges into the large diameter portion of the rear cable groove and another branch that merges into the diametrical transition portion of the front cable groove and dead-ends at the small diameter portion of the front cable groove.

7. A sliding door closure apparatus as defined in claim 6 in which the front cable extends from the spool at a front fleet angle of sufficient magnitude to guide the front cable into the diametrical transition portion of the front cable groove and away from the large diameter portion of the rear cable groove as the door moves toward the closed position.

8. A sliding door closure apparatus as defined in claim 7 in which the rear cable extends from the spool at a rear fleet angle opposite the front fleet angle, the rear fleet angle being of sufficient magnitude to guide the rear cable into the large diameter portion of the front cable groove and away from the diametrical transition portion of the front cable groove as the door moves toward the open position.

9. A sliding door closure apparatus as defined in claim 4 in which the closed loop cable closure system includes:

a fixed idler roller mounted on the vehicle frame and spaced from the cable drive;

a spring biased roller mounted on the frame between the cable drive spool and the fixed idler roller and spring biased into contact with one of the front and rear cables to place that cable in tension, the fixed idler roller and the spring biased roller being mounted in positions that provide cable tension when the cable is driven by one of the front and rear large diameter cable grooves that is generally equal to the cable tension provided when the cable is driven by one of the front and rear small diameter cable grooves.

10. A sliding door closure apparatus for opening and closing a sliding door on a vehicle, the apparatus comprising:

a vehicle;

a sliding door supported on a sliding door track mounted on the vehicle, the sliding door being moveable along the sliding door track between a closed position and an open position; and a closed loop cable closure system mounted on the vehicle and comprising a cable drive assembly that includes:

a helical front cable groove supported on the vehicle for rotation about a helix axis;

a helical rear cable groove supported on the vehicle frame for rotation about the helix axis; an outer end of the front cable groove having a helical diameter larger than that of an inner end of the front cable groove;

an outer end of the rear cable groove having a helical diameter larger than that of an inner end of the rear cable groove;

the front cable groove including a front diametrical transition portion extending between and connecting large and small diameter portions of the front cable groove;

the rear cable groove including a rear diametrical transition portion extending between and connecting large and small diameter portions of the rear cable groove;

a groove fork that splits the front cable groove into one branch that merges into the large diameter portion of the rear cable groove and another branch that merges into the diametrical transition portion of the front cable groove and dead-ends at the small diameter portion of the front cable groove, a front cable that extends from the front cable groove to the sliding door in a position to be wound into and unwound from the front cable groove in response to front cable groove rotation about the helix axis;

a rear cable that extends from the rear cable groove to the sliding door in a position to be wound into and unwound from the rear cable groove in response to rear cable groove rotation about the helix axis;

a motor drivingly connected to the cable grooves and configured to rotate the grooves in one direction about the helix axis to open the sliding door and in an opposite direction about the helix axis to close the sliding door; and a single cable drive spool supported on the vehicle for rotation about the helix axis and including both the front and the rear cable grooves.

11. A sliding door closure apparatus as defined in claim 10 in which the front cable extends from the spool at a front fleet angle of sufficient magnitude to guide the front cable into the large diameter portion of the front cable groove and away from the diametrical transition portion of the rear cable groove as the door moves toward the closed position and in which the rear cable extends from the spool at a rear fleet angle opposite the front fleet angle, the rear fleet angle being of sufficient magnitude to guide the rear cable into the large diameter portion of the front cable groove and away from the diametrical transition portion of the front cable groove as the door moves toward the open position.

\* \* \* \* \*